United States Patent [19]
Jackson et al.

[11] Patent Number: 5,216,811
[45] Date of Patent: Jun. 8, 1993

[54] METHOD FOR FORMING A BUSHING

[75] Inventors: Arthur C. Jackson, Carmel; Raymond P. Chandler, Muncie, both of Ind.

[73] Assignee: Steel Parts Corporation, Tipton, Ind.

[21] Appl. No.: 905,735

[22] Filed: Jun. 29, 1992

Related U.S. Application Data

[62] Division of Ser. No. 579,609, Sep. 10, 1990, Pat. No. 5,145,143.

[51] Int. Cl.[5] .............................................. F16C 33/00
[52] U.S. Cl. ........................... 29/898.056; 29/898.054; 72/368; 384/276
[58] Field of Search ..................... 29/898.054, 898.056, 29/898.057; 72/367, 368; 384/276, 280

[56] References Cited

U.S. PATENT DOCUMENTS

| | | | |
|---|---|---|---|
| 3,064,608 | 11/1962 | Karmazin | 72/368 |
| 3,537,292 | 11/1970 | Federspill | 72/368 |
| 3,540,252 | 11/1970 | Pfanner | 72/368 X |

FOREIGN PATENT DOCUMENTS

| | | | |
|---|---|---|---|
| 43210 | 10/1932 | France | 72/368 |
| 349567 | 12/1960 | Switzerland | 72/368 |
| 526423 | 8/1976 | U.S.S.R. | 29/898.054 |
| 387968 | 2/1933 | United Kingdom | 72/368 |

*Primary Examiner*—Mark Rosenbaum
*Assistant Examiner*—S. Thomas Hughes
*Attorney, Agent, or Firm*—Barnes & Thornburg

[57] ABSTRACT

An apparatus for use in a vibration damping assembly includes a bushing that is die formed from a steel blank. The bushing is formed to have a substantially tubular shape with an interior surface defining an inner cavity into which moving rods can be inserted, an exterior surface, and a joint having a first edge in overlapping contact with a second edge to form a contact surface. The joint formed by the contact surface between the first and second edges extends between the exterior surface and the interior surface of the bushing.

13 Claims, 1 Drawing Sheet

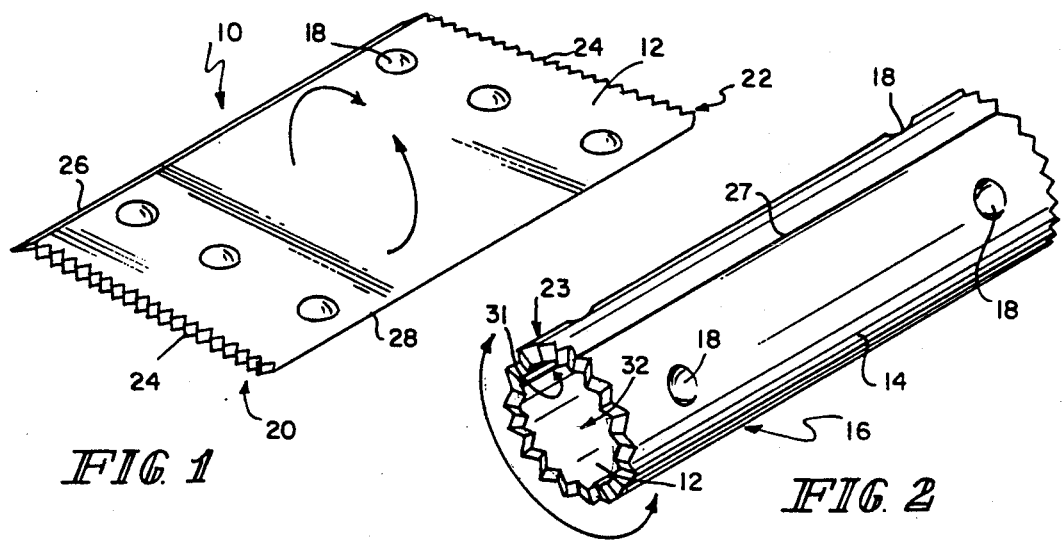
FIG. 1    FIG. 2
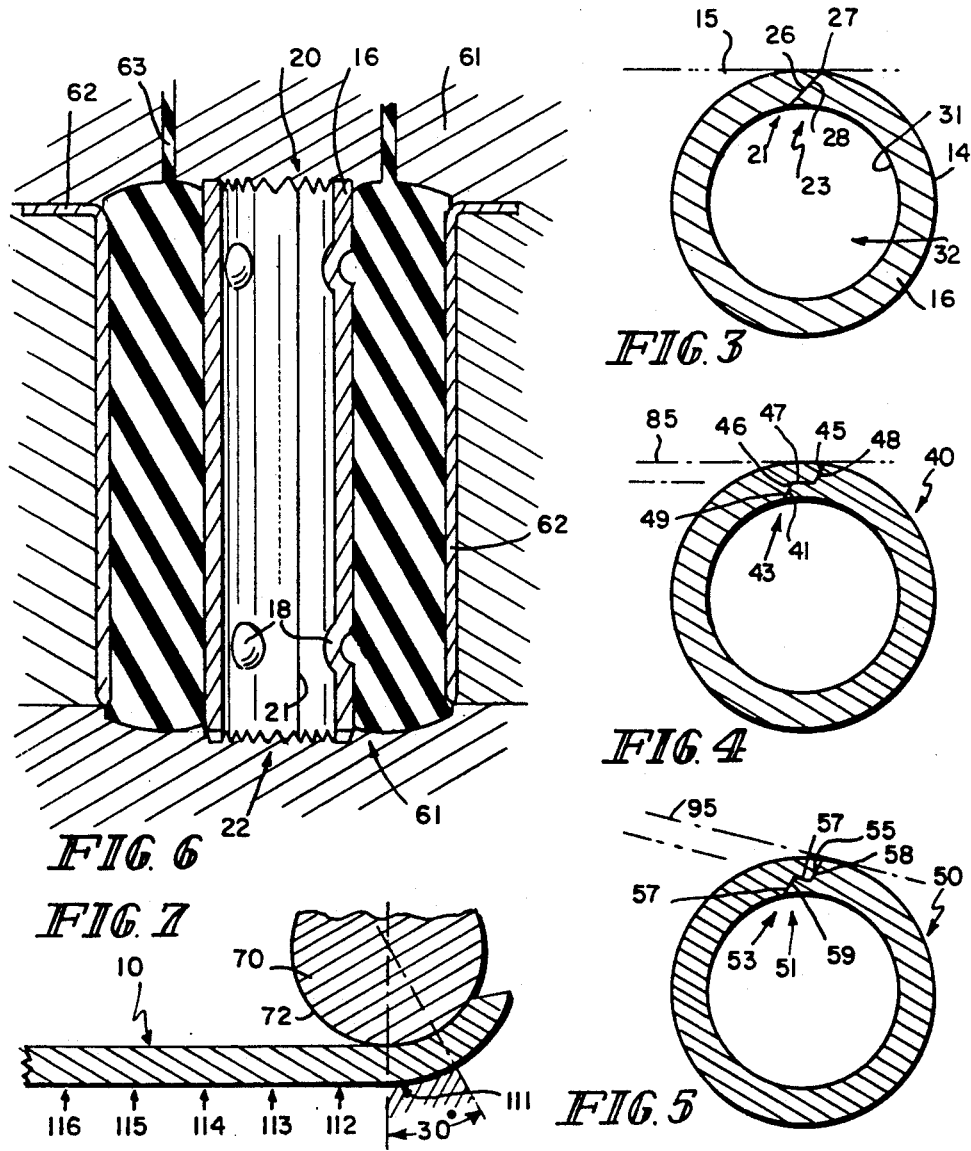
FIG. 6    FIG. 3
FIG. 7    FIG. 4
FIG. 5

METHOD FOR FORMING A BUSHING

This is a division of application Ser. No. 579,609, filed Sep. 10, 1990, now U.S. Pat. No. 5,145,143.

FIELD OF THE INVENTION

This invention relates to an apparatus for damping vibration associated with moving rods, pins, or shafts. More particularly, a low cost bushing that can be formed from a steel blank is described. The bushing surrounds and keeps in alignment vibrating, twisting, or rotating shafts such as are commonly encountered in automotive and industrial devices while reducing the transfer of undesired vibratory motion from the shaft to the bushing mount.

BACKGROUND AND SUMMARY OF THE INVENTION

Many types of automotive or industrial machinery require placement of bushings to guide or restrain the movement of tie rods, pins, shafts, or bars. Lacking such guide means, a tie rod or other mechanical linkage could uncontrollably vibrate, damaging itself or other essential machinery. To guide such rods, it is a common practice to surround a rod with a bushing, guide sleeve, or similar means for preventing movement of the rod in undesired directions. Generally, this bushing or guide sleeve is permanently mounted to maintain a predetermined direction with respect to a rigid framework or other portion of an automobile or industrial machinery.

For many applications however, simply surrounding the rod with a bushing or other type of guide sleeve mounted to a frame provides a route for the transfer of vibratory motion from the rod to the framework. To inhibit such transfer of vibrational energy through the bushing, it is possible to damp vibration from the bushing to the framework by interposing an intermediary coupling of a vibration absorbing material between the bushing and a mount for the bushing. Because of its low cost, durability, and shock absorbing ability, a commonly employed vibration absorbing material is rubber. Rubber can be molded under high pressure at moderate temperatures to form an elastic mechanical linkage between a bushing and a bushing mount. Vibratory motion transferred from a rod to the bushing is substantially dissipated (as heat) by the rubber surrounding the bushing, greatly reducing the amount of vibration transferred from the bushing to the bushing mount.

However, those skilled in the art have found that high pressure molding of rubber or other elastomeric materials to form an elastic vibration dissipating linkage between bushings and bushing mounts can be difficult. Because of the high pressures required to form high density rubber that tightly couples the bushing to the bushing mount, the bushing must be constructed to withstand substantial inwardly directed radial pressure without breaching or otherwise collapsing under pressure. One method of constructing such high strength bushings is to cut them from commercially available rolled or extruded steel pipe or tubing. The cylindrical shape of the pipe or tube redistributes radially directed forces, minimizing the chance of collapse or breach of the bushing when the bushing is placed under pressure. Bushings are constructed from cylindrical pipe or tube by cutting a desired length of appropriately sized pipe or tube, and machining the ends of pipe or tube by drilling, stamping or cutting to the desired shape. However, this method of bushing manufacture is not preferred because of the high cost of commercially available steel pipe or tube, the difficulty in machining the pipe ends, and the limited range of materials and sizes in which pipes and tubes can be obtained easily.

Bushings can also be formed from coil steel cut into planar, rectangular steel blanks having edges oriented orthogonal to the plane of the blank. The blank can be formed around a mandrel to join two opposed edges and form a generally tubular bushing having an interior cavity through which rods or shafts can be inserted. However, such bushings often cannot be used in conjunction with a high pressure molded rubber vibration damping linkages. During heat treating, such bushings tend to relieve strain by slightly unrolling. This leaves a gap in the joint between the two opposed edges through which molded rubber, injected under high pressure into the volume between the bushing mount and the bushing, can pass into the interior cavity of the bushing and obstruct later insertion of rods, shafts, or the like into the interior cavity of the bushing.

It is therefore an object of the present invention to provide a low cost bushing suitable for use in guide assemblies for moving or vibrating rods, shafts, or the like.

It is another object of this invention to provide a bushing suitable for use in a vibration damping assembly including a bushing, a bushing mount that supports the bushing, and an elastic coupling material positioned between the bushing and the bushing mount to dissipate vibratory motion of the bushing.

Another object of the invention is to provide a bushing that can be formed from low cost coil steel by joining the edges of a steel blank cut from the coil steel and forming the blank into a tubular bushing that resists opening of the joint upon heat treatment of the bushing.

Yet another object of this invention is to form a vibration damping assembly that includes a bushing formed from low cost coil steel, a bushing mount for supporting the bushing in a desired orientation, and a vibration absorbing material injected under pressure into a volume between the bushing and the bush mounting to couple the bushing to the bushing mount and dissipate vibratory motion.

In accordance with the foregoing objectives, an apparatus used in a vibration damping assembly includes a bushing formed to have a substantially tubular shape with an interior surface defining an inner cavity into which moving rods can be inserted, an exterior surface, and a joint having a first edge in overlapping contact with a second edge to form a contact surface. The joint formed by the contact surface between the first and second edges extends between the exterior surface and the interior surface of the bushing.

Generally, a first portion of the contact surface of the joint extends along a plane directed at a non-perpendicular dihedral angle relative to a plane lying tangent to a line formed by the joint on the exterior surface of the bushing so that the first edge of the joint overlaps the second edge of the joint. In alternative embodiments that can be used in conjunction with the foregoing embodiment, a second portion of the contact surface of the joint is formed to extend along a plane directed parallel to a plane lying tangent to the line formed by the joint on the exterior surface of the bushing. In either of the above embodiments, the contact surface forming the joint overlaps even after expansion or slight unrolling of the steel forming the tube, effectively preventing migration of vibration absorbing material (such as rubber) placed in contact with the exterior surface of said bushing through the joint into the inner cavity of the bushing.

One advantage of the present invention is the ease of forming low cost bushings suitable for use in guide assemblies for moving or vibrating rods, shafts, or the like from planar, rectangular steel blanks cut from strips of coil steel. As compared to bushings formed from tubular piping, which must be modified by expensive machining, drilling, or grinding, steel blanks can be inexpensively altered by punching, stamping, or die cutting before being forming the steel blank into a tubular configuration.

Another advantage of the present invention is that bushings having a minimal tendency to unroll in the course of heat treatment can be produced. Such bushings can be used in applications that require precise tolerances and where the bushing must have an unbroken joint that prevents migration of vibration absorbing material into the interior of the bushing.

Yet another advantage of bushings formed in accordance with this invention is their ability to be used as cost effective bushings in vibration damping assemblies that include a bushing surrounded by rubber or other vibration absorbing material. The rubber, injected at high pressure into a mold containing the bushing, will not migrate through the joint into the interior cavity of the bushing. This allows rods, shafts, or other similar devices to be inserted into the interior cavity of the finished bushing without impediment.

BRIEF DESCRIPTION OF THE DRAWINGS

FIG. 1 is a perspective view of a steel blank previously cut from coil steel and ready to be formed into a tube in accordance with this invention;

FIG. 2 is a perspective view of the bushing formed from the steel blank shown in FIG. 1;

FIGS. 3, 4, and 5 are sectional views of bushings in which the overlapping edge configuration that acts to provide a longitudinally extending joint that prevents migration of rubber into an interior cavity of the bushing during a rubber molding process;

FIG. 6 is a sectional view of a mold showing injection of rubber into a mold cavity surrounding the bushing of FIG. 2; and FIG. 7 illustrates a portion of the steel blank being formed around a mandrel.

DETAILED DESCRIPTION OF PREFERRED EMBODIMENTS

As illustrated in FIGS. 1 and 2, a steel blank 10, having an upper surface 12 and an opposed lower surface 14 (indicated in FIG. 2), is used to form a bushing 16. The steel blank 10 has a plurality of dimples 18 that can act as baring surfaces for rods, shafts or the like. Two opposed edges 20 and 22 have a plurality of teeth 24 extending along the respective edges. The steel blank 10 also has a first and a second edges 26 and 28, both of which are formed to have edge surfaces directed at a non-perpendicular dihedral angle relative to the plane of the upper surface 12 or the lower surface 14.

The steel blank 10 is typically formed from a master coil of steel (not shown). This master coil is apportioned into several slit coils (not shown), which can in turn be thinned or otherwise worked to a desired thickness. The steel blank 10 is then formed by cutting rectangular sections having desired dimensions from the worked slit coils of steel. The steel can be high strength low alloy steels, carbon steels ranging from SAE 1006 up to SAE 1035, or any other commercially available steels distributed in coiled form. The edges 26 and 28 of such slit coil steels can be easily machined or ground to have a desired non-perpendicular angled edge using known machining techniques. Other modifications to the steel blank 10, such as coining with a punch press to produce dimples 18, or by machining or grinding the initially smooth surfaced edges 20 and 22 to form the teeth 24, can also be accomplished with conventional machining techniques.

The bushing 16, shown in FIG. 2 in perspective and in cross section in FIG. 3, is formed from steel blank 10 by bringing together the first and second edges 26 and 28 to form a joint 23 along an overlapping contact surface 21 (best illustrated in cross section in FIG. 3). Forming the steel blank 10 about a curved mandrel 70 (shown in FIG. 7) in the direction indicated by the arrows in FIG. 1 transforms the upper surface 12 into an interior surface 31 (indicated in FIG. 2) that defines a generally cylindrical interior cavity 32 of the bushing 16. The lower surface 14 is similarly converted into an exterior cylindrical surface 34 of the bushing 16 by forming the steel blank 10 into bushing 16.

As generally illustrated in FIG. 7, formation of the bushing 16 takes place in several stages. The mandrel 70 having a surface 72 that presents a curved cross section is positioned adjacent to the steel blank 10. By hammering, pressing, or some other forcing mechanism, a first portion 111 of the steel blank 10 is formed against the surface 72 of the mandrel 70 to have the desired curvature (in the illustrated example a curve over 30 degrees of the steel blank 10 is imparted). This procedure is repeated over the remainder of the steel blank 10 so that second, third, fourth, fifth, and sixth portions 112, 113, 114, 115, and 116 are formed against the mandrel 70. This process is complete when the bushing 16 has a circular cross section. Formation of the bushing 16 in this manner acts to distribute stresses throughout the bushing 16, and reduces the tendency of the bushing 16 to unroll during heat treatment.

In accordance with this invention the bushing 16 illustrated in FIGS. 2 and 3 has an edge geometry that allows overlapping contact between the edges 26 and 28. This geometry ensures that when edges 26 and 28 are brought into contact with each other, the contact surface 21 defining a joint 23 is formed. The joint 23 is indicated by a joint line 27 extending along the surface 14 of the bushing 16. The contact surface 21 extends along an imaginary plane directed at a non-perpendicular dihedral angle relative to a plane 15 lying tangent to the joint line 27 on the exterior surface of the bushing 16.

FIG. 4 illustrates an alternative geometry for a bushing 40 having edges 46 and 48. The edges 46 and 48 are brought into contact with each other to form a contact surface 41 defining a joint 43. The contact surface 41 is divided into several parts, with a first portion 45 extending along an imaginary plane directed at a non-perpendicular dihedral angle relative to a plane 85 lying tangent to a line formed by the joint 43 on the exterior surface of the bushing 40. The contact surface 41 also has a second portion 47 that extends substantially parallel to the plane 85. A third portion 49 intercepts the second portion 47, and continues parallel to the plane along which the first portion 45 extends. As with the bushing shown in FIG. 3 and 4, the contact surface 41 is maintained unbroken during expansion of the bushing 40 during tempering or heating. Unlike the embodiment of bushing 16 shown in FIGS. 2 and 3, the second portion 47 of bushing 40 will tend to remain in contact even though contact at the first and third portions 45 and 49 may be broken.

Another alternative edge geometries in accordance with this invention is shown in FIG. 5 in a cross sectional illustration that shows bushing 50 having edges 56 and 58. The edges 56 and 58 are brought into contact with each other to form a contact surface 51 defining a joint 53. The contact surface 51 is divided into several parts, with a first portion 55 extending along an imaginary plane directed at a non-perpendicular dihedral angle relative to a plane 95 lying tangent to a line formed by the joint 53 on the exterior surface of the bushing 50. The contact surface 51 also has a second portion 57 that extends at a non-parallel dihedral angle relative to that same imaginary plane 15. A third portion 59 intercepts the second portion 57, and continues parallel to the plane along which the first portion 55 extends. As with the bushing shown in FIGS. 2-4, the contact surface 51 is maintained unbroken during expansion of the bushing 50 during tempering or heating. This embodiment has an additional self-locking feature, because the portion of the edges 56 and 58 that come together to form the second portion 57 of the contact surface 51 will frictionally lock as the edges 56 and 58 attempt to part from each other by unrolling.

Formation of a vibration damping assembly 60 is shown in FIG. 6. The vibration damping assembly 60 includes the bushing 16 centrally located in a bushing mount 62. Connecting the bushing 16 to the bushing mount 62 is rubber 64, a preferred moldable, elastomeric material capable of absorbing and dissipating vibration. As shown in FIG. 6, the assembly is housed in the cavity defined by a mold 61. The exterior surface of the bushing 16 can be optionally coated with any art recognized glue, binder, or other adhesive in order to ensure fixation of the rubber 64 to the bushing 16. Rubber is injected at a pressure of about 40,000 psi through sprues 63 to fill space between the bushing 16 and the bushing mount 62 with high density rubber 16. Following removal from the mold 61, the vibration damping assembly can be used in applications requiring the damping of vibrations resulting from motion of rods, shafts or the like (not shown) passing through the bushing 16.

Although the invention has been described in detail with reference to certain preferred embodiments, variations and modifications exist within the scope and spirit of the invention as described and defined in the following claims.

What is claimed is:

1. A method for forming a bushing having an interior surface defining an interior cylindrical cavity, a cylindrical exterior surface suitable for contacting vibration absorbing material, a joint extending between the exterior surface and the interior surface, and means for preventing migration through the joint of vibration absorbing material, wherein said method includes the steps of forming a steel blank having parallel upper and lower surfaces and opposed first and second edges with at least some portion of both of said edges being oriented with respect to the upper and lower surfaces of the steel blank at a dihedral angle greater than 90 degrees, and curving the steel blank into a cylinder to cause the dihedral angle portion of the first edge of the steel blank to abut the dihedral angle portion of the second edge of the steel blank to form an overlapping zone of contact so that the upper surface defines the cylindrical interior cavity of the bushing and the lower surface defines the cylindrical exterior surface of the bushing.

2. The method of claim 15 wherein the curving step further comprises bending a plurality of portions of the steel blank to distribute stress throughout the bushing and reduce any tendency to unroll when heat treated.

3. The method of claim 2, wherein each of the first and second edges are formed with at least two discrete portions
wherein one portion of the at least two discrete portions of one of the edges is oriented with respect to the upper surface at the dihedral angle and another of the at least two discrete portions of the one edge is oriented with respect to the lower surface at the dihedral angle.

4. The method of claim 18, wherein one portion of the at least two discrete portions of the other edge is oriented with respect to the upper surface at the dihedral angle and another of the at least two discrete portions of the other edge is oriented with respect to the lower surface at the dihedral angle.

5. The method of claim 4, wherein the area has a surface parallel to the upper and lower surfaces.

6. The method of claims 3, wherein there is an area between each of the at least first and second portions of both edges.

7. The method of claim 6, wherein the area has a surface parallel to the upper and lower surfaces.

8. The method of claim 2, wherein there is an area between each of the at least first and second portions of both edges.

9. The method of claim 8, wherein the area has a surface parallel to the upper and lower surfaces.

10. The method of claim 1, wherein each of the first and second edges are formed with at least two discrete portions
wherein one portion of the at least two discrete portions of one of the edges is oriented with respect to the upper surface at the dihedral angle and another of the at least two discrete portions of the one edge is oriented with respect to the lower surface at the dihedral angle.

11. The method of claim 10, wherein there is an area between each of the at least first and second portions of both edges.

12. The method of claim 11, wherein the area has a surface parallel to the upper and lower surfaces.

13. The method of claim 17, wherein one portion of the at least two discrete portions of the other edge is oriented with respect to the upper surface at the dihedral angle and another of the at least two discrete portions of the other edge is oriented with respect to the lower surface at the dihedral angle.

* * * * *